R. W. HASTINGS AND C. W. PARKER.
OIL RETAINER.
APPLICATION FILED SEPT. 22, 1920.

1,381,120.

Patented June 14, 1921.

Inventors
Roger W. Hastings
and Clark W. Parker.
By Edward N. Pagelsen,
Attorney

UNITED STATES PATENT OFFICE.

ROGER W. HASTINGS AND CLARK W. PARKER, OF NEW YORK, N. Y.; SAID HASTINGS ASSIGNOR TO SAID PARKER.

OIL-RETAINER.

1,381,120. Specification of Letters Patent. Patented June 14, 1921.

Application filed September 22, 1920. Serial No. 411,893.

*To all whom it may concern:*

Be it known that we, ROGER W. HASTINGS and CLARK W. PARKER, citizen of the United States, and residing at New York, county of New York, and State of New York, have invented a new and Improved Oil-Retainer, of which the following is a specification.

This invention relates to axle constructions of the general type shown by my prior Patent No. 1,315,236, dated September 9, 1919, although not limited to rear axles, and its object is to prevent the escape of lubricating oil from the receptacle which incloses the driving gears of such axle constructions.

This invention consists in the details of construction illustrated in the accompanying drawing and particularly pointed out in the claims.

Figure 1:
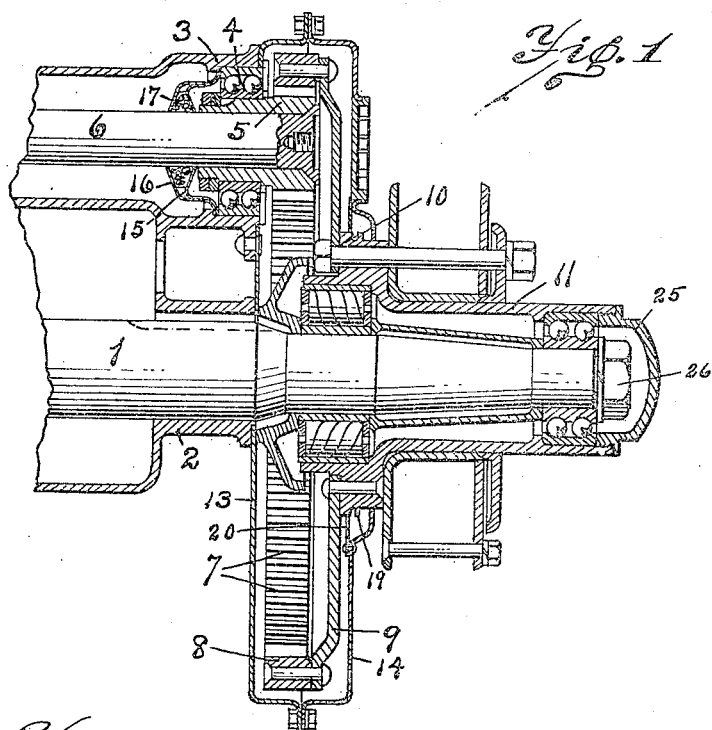
Figure 3:
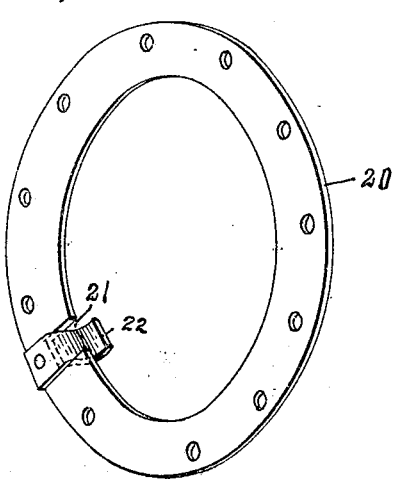
Figure 2:
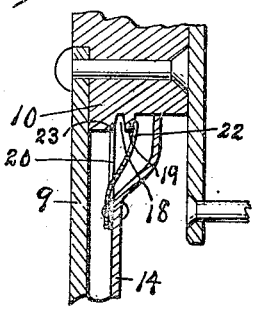

In the drawing, Figure 1 is a longitudinal section of a tractor wheel hub and the driving and supporting mechanism therefor. Fig. 2 is a central section of the oil retainer. Fig. 3 is a perspective of the oil retainer.

Similar reference characters refer to like parts throughout the several views.

Fig. 1 shows an axle 1 and a casing 2 mounted thereon which embodies a cylindrical portion 3 in which is mounted the bearing 4 for the pinion 5, the pinion being attached to the shaft 6, which may be driven in any desired manner. The pinion meshes with the teeth 7 of the internal gear ring 8 secured to the disk 9, which in turn is secured to the flange 10 of the hub 11 rotatably mounted on the outer end of the axle 1.

Secured to the casing 2 just around the axle and also to the part 3 of the casing just around the pinion is a dished plate 13 whose outer edge connects to the ring 14, the plate 13 and the ring 14 constituting a retainer for the lubricant which constantly keeps the teeth of the pinion and the gear ring and the bearings for the pinion and the hub supplied with oil.

To prevent the oil from escaping along the shaft 6 an oil retainer is provided consisting of the pressed rings 15 and 16 and the packing ring 17 of felt or other fibrous material between them. This oil retainer is held in position by the bearing for the pinion. This mechanism in itself forms no part of the present invention.

In Figs. 2 and 3 are shown the flange 10 of the hub which is formed with a groove 18 and a sharp circumferential rib 19, and the ring 20 which is attached to the ring portion 14 of the oil receptacle and is provided with a notch 21. The ring 20 extends around just out of contact with the portion of the hub of largest diameter and the ring 14 around a portion of smaller diameter while a finger 22 of thin sheet metal presses lightly against the rib 19, being so secured to the ring 20 as to extend into the notch 21.

Lubricant reaches the flange 10 of the hub in small amounts when the hub is turning slowly and most of it is wiped off by the inner edge of the ring. Of the remainder which passes the inner edge of the ring 20, the greater portion drips off the edge 23 of the flange 10. The small amount which passes to the outside of the rib 19 is all scraped off by the finger 22 and runs down the finger into the oil receptacle. It will be understood that this finger is preferably mounted at the lowest point in the ring 20.

Owing to the largest diameter of the hub being within the ring 20, the ring 14 of the oil receptacle can be freely removed, permitting the removal of the hub and the parts connected thereto after the hub cap 25 and the nut 26 have been taken off. This is of great importance as it reduces to a minimum the number of parts which must be disconnected to get at the hub bearings.

The details of this construction may be modified to meet the various requirements by those skilled in the art without departing from the spirit of our invention as set forth in the following claims.

We claim:—

1. An oil retainer comprising an annular oil receptacle surrounding the driving mechanism of a tractor wheel whose hub comprises a circumferential rib, a ring secured to the inner side of the outer wall of the receptacle concentric with the hub, and a metal finger mounted on said ring and engaging the outer side of said rib.

2. In combination, a wheel hub having a circumferential rib, an annular oil receptacle surrounding the hub, a ring secured to the inner side of one wall of the receptacle concentric with the hub, and a metal finger mounted on said ring and engaging said rib.

3. In combination, an axle, a tractor wheel hub mounted thereon and having a portion of greatest diameter and a circumferential rib separated therefrom by a groove, an oil receptacle attached to the axle and comprising two annular parts connected at their outer edges and inclosing the portion of the hub of greatest diameter and said rib, and an oil intercepting ring attached to the inner side of the outer part of the receptacle and of greater internal diameter than the diameter of said rib.

4. In combination, an axle, a tractor wheel hub mounted thereon and having a portion of greatest diameter and a circumferential rib separated therefrom by a groove, an oil receptacle attached to the axle and comprising two annular parts connected at their outer edges and inclosing the portion of the hub of greatest diameter and said rib, an oil intercepting ring attached to the inner side of the outer part of the receptacle and of greater internal diameter than the diameter of said rib, said ring having a notch in its inner edge, and a spring finger mounted in said notch and engaging the rib on the hub to scrape off the oil thereon.

5. In combination, a vehicle wheel hub and a driving gear attached thereto, an axle on which the hub is mounted, a circular oil receptacle attached to the axle and extending around said gear, the outer portion of said receptacle comprising a disk having a central opening through which the hub extends, a ring secured to the inside of said disk in alinement with the largest diameter of said hub, and means for engaging the hub between the disk and ring.

6. In combination, a wheel hub having a circumferential groove in the portion of greatest diameter to leave a circumferential rib, a driving gear attached to the hub, an oil receptacle comprising circular disks having central apertures and formed with engaging flanges at their outer edges, the inner edge of the outer disk being positioned outside of the rib, a ring attached to the oil receptacle in a transverse plane passing through the portion of the hub of greatest diameter, and means to remove lubricating oil from said rib.

ROGER W. HASTINGS.
CLARK W. PARKER.